C. G. & P. A. LARSON.
TRY SQUARE.
APPLICATION FILED MAR. 1, 1912.
1,037,155.
Patented Aug. 27, 1912.
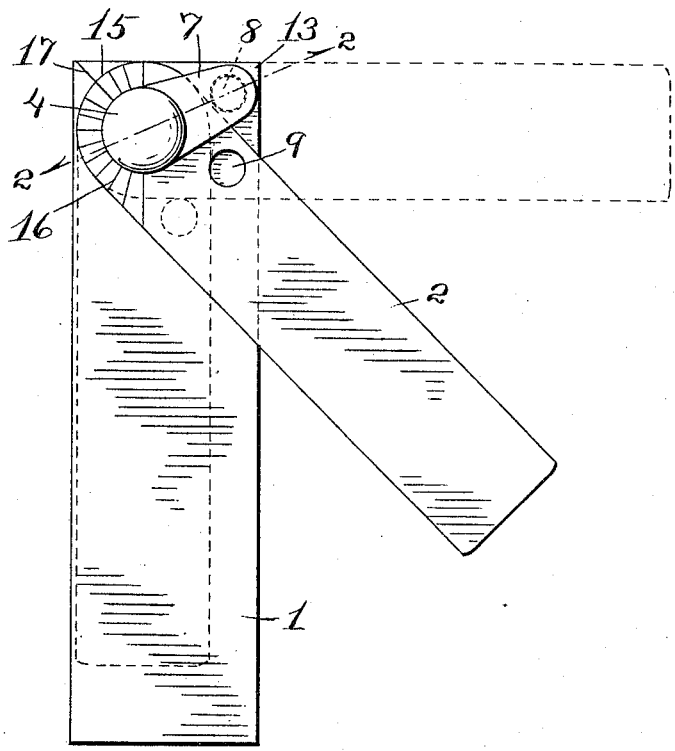
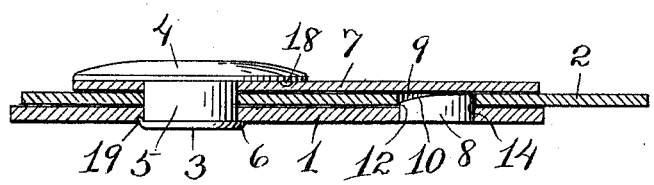
Witnesses
Stuart Hilder.
Frances W. Anderson.
Inventors
C. G. Larson.
P. A. Larson
by E. W. Anderson son
Attorneys

UNITED STATES PATENT OFFICE.

CHARLES G. LARSON AND PETER A. LARSON, OF BURLINGTON, IOWA.

TRY-SQUARE.

1,037,155.

Specification of Letters Patent. Patented Aug. 27, 1912.

Application filed March 1, 1912. Serial No. 680,936.

*To all whom it may concern:*

Be it known that we, CHARLES G. LARSON and PETER A. LARSON, citizens of the United States, residents of Burlington, in the county of Des Moines and State of Iowa, have made a certain new and useful Invention in Try-Squares; and we declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of our try square. The folded and unfolded portions, of the blade being shown in dotted lines Fig. 2 is a section on the line 2—2, Fig. 1.

The invention has relation to folding try-squares, and it consists in the novel construction and combinations of parts as hereinafter set forth.

In the accompanying drawings, illustrating the invention, the numeral 1 designates the handle member of the square and 2 is the blade member, pivoted to the handle by means of a rivet or pivot pin 3, having a head 4 and a stem 5 upset at 6 to bind the members together.

Located between the rivet head and the blade is a plate spring 7, fastened at its inner end to and fixed with relation to said head, the stem of the rivet pin being in turn fixed with relation to said handle, said plate spring bearing upon said blade and serving to press it closely against the handle at all times.

The handle 1 is provided with a laterally projecting pin 8, over which the outer end of the plate spring extends, and the blade is provided with a perforation 9 which is designed to engage with said pin when the blade is squared or at an angle of ninety degrees with relation to the handle. In order that the blade may pass over the pin sufficiently to allow the perforation to engage the same, said pin is beveled slightly at its outer end at one side at 10, the blade rising upon said bevel, the plate spring being at the same time bent outward or put under greater tension, and the blade finally falling again or snapping home through pressure of said spring upon said pin, where it is securely held against accidental displacement.

When the blade is to be folded it is lifted slightly away from the handle and pressed to fold.

The blade is frictionally held against its handle by the rivet and by the plate spring, so that its angular adjustment to varying degrees with relation to the handle is secure for measuring or comparing angles.

It is preferred when the blade has been adjusted to the half-way point, or forty-five degrees with relation to the handle, that it contacts at its edge with a shoulder 12 of the pin, as shown in Fig. 2 of the drawings in full lines, the pin in this way forming a stop for the blade. In carrying out this construction the pin is located at the handle corner 13, and the plate spring extends from the rivet toward said corner and over the pin in an oblique manner. And in order that the blade may not be folded too easily when at ninety degrees with relation to the handle, the perforation wall engages a shoulder 14 of the pin opposite the bevel 10.

It is desirable to have the rivet head act as a stiffener for the spring, to resist outward movement thereof, said head being somewhat enlarged and extending over the inner end portion of said spring for this purpose.

The inner end of the blade is preferably rounded as shown at 15, and graduated at 16 for comparison with an indicator line 17 of the handle in the measurement of angles.

The invention is of simple and durable nature, capable of economical manufacture, and will well serve the purposes for which it is intended.

A means is provided to hold the spring plate stationary with relation to the rivet pin, consisting preferably of a stop pin or projection 18 of the rivet head engaging a seat in said plate; and a means is provided to hold the rivet stationary with relation to the handle member 1, consisting preferably of a similar stop pin or projection 19, engaging a seat in said member.

Having thus described our invention, what we claim as new and desire to secure by Letters Patent is:

A try-square, consisting of a handle member, a blade member, a pivot pin connecting the members, and a lateral pin upon one of the members, the other member having a perforation for engagement with said pin when the members are at an angle of ninety degrees with relation to each other, said lateral pin having engagement with the edge of and forming a stop for said blade when the members are at an angle of forty-five
5 degrees, and a plate spring confined by said pivot pin and having extension over said lateral pin to press the members together.

In testimony whereof we affix our signatures, in presence of two witnesses.

CHARLES G. LARSON.
PETER A. LARSON.

Witnesses:
C. H. MOHLAND,
JOSEPHINE WEDERTZ.

Copies of this patent may be obtained for five cents each, by addressing the "Commissioner of Patents, Washington, D. C."